(12) United States Patent
Todorovic

(10) Patent No.: US 11,248,561 B2
(45) Date of Patent: Feb. 15, 2022

(54) EXHAUST NOZZLE OF A GAS TURBINE ENGINE

(71) Applicant: Rolls-Royce Deutschland Ltd & Co KG, Blankenfelde-Mahlow (DE)

(72) Inventor: Predrag Todorovic, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 141 days.

(21) Appl. No.: 16/719,112

(22) Filed: Dec. 18, 2019

(65) Prior Publication Data
US 2021/0189999 A1   Jun. 24, 2021

(51) Int. Cl.
*F02K 1/08* (2006.01)
*F02K 1/82* (2006.01)

(52) U.S. Cl.
CPC .............. *F02K 1/08* (2013.01); *F02K 1/82* (2013.01); *F05D 2220/323* (2013.01); *F05D 2240/128* (2013.01); *F05D 2240/91* (2013.01); *F05D 2260/941* (2013.01)

(58) Field of Classification Search
CPC ..... F02K 1/04; F02K 1/08; F02K 1/82; F02K 1/85; F05D 2220/323; F05D 2240/128; F05D 2240/91
See application file for complete search history.

(56) References Cited

U.S. PATENT DOCUMENTS

| | | | | |
|---|---|---|---|---|
| 3,807,639 A * | 4/1974 | Soligny | ............ | F02K 1/08 239/265.19 |
| 4,043,508 A * | 8/1977 | Speir | ............ | F02K 1/08 239/265.19 |
| 4,241,876 A * | 12/1980 | Pedersen | ............ | F02K 1/085 239/265.27 |
| 4,527,388 A * | 7/1985 | Wallace, Jr. | ............ | F02K 1/09 239/265.19 |
| 4,537,026 A * | 8/1985 | Nightingale | ............ | F02K 1/825 239/127.3 |
| 5,038,559 A * | 8/1991 | Blackmore | ............ | F02K 1/08 60/204 |
| 5,082,181 A * | 1/1992 | Brees | ............ | F02K 1/006 239/265.35 |
| 8,516,824 B2 * | 8/2013 | Journade | ............ | F02K 3/06 60/771 |
| 10,724,472 B1 * | 7/2020 | Chase | ............ | F02K 1/15 |

FOREIGN PATENT DOCUMENTS

DE    102017130563 A1    6/2019

* cited by examiner

*Primary Examiner* — Craig Kim
(74) *Attorney, Agent, or Firm* — Shuttleworth & Ingersoll, PLC; Timothy Klima

(57) ABSTRACT

An exhaust nozzle of a gas turbine engine includes an outer nozzle wall, a centerbody arranged in a flow channel, and two struts connecting the centerbody to the wall. A first strut is connected to the wall by a first connection allowing movement of the strut relative to the nozzle wall in the axial direction. Another strut is connected to the wall by a second connection allowing movement of the strut relative to the wall in the radial and axial directions. The second connection is formed by a sliding element and a receiving slot, wherein the sliding element includes an interaction zone interacting with an actuator for axial movement. The interaction zone has a radial length such that the interaction between the actuator and the interaction zone is maintained when the sliding element is moved in the radial direction by radial thermal expansion of the strut and/or the centerbody.

20 Claims, 8 Drawing Sheets

EXHAUST NOZZLE OF A GAS TURBINE ENGINE

The present disclosure relates to an exhaust nozzle of a gas turbine engine.

It is known to provide for a variable area exhaust nozzle that comprises an outer nozzle wall and a centerbody that is displaceable in the axial direction relative to the outer nozzle wall. Document DE 10 2017 130 563 A1 describes an exhaust nozzle of a turbofan engine that comprises a centerbody which is connected by means of struts to an outer nozzle wall. To move the centerbody in the axial direction, the struts are axially displaceable relative to the nozzle wall.

In such arrangement, the centerbody and the struts are exposed both to the hot core airflow from the primary channel that has passed the core engine and to the colder bypass airflow from the bypass channel, whereas the outer nozzle wall is exposed mostly to the colder bypass airflow. This leads to a different thermal expansion of these components and, accordingly, to thermal stresses acting on these components.

There is thus a need to provide for a variable area exhaust nozzle with a centerbody that is displaceable in the axial direction that avoids the generation of thermal stresses that act on the outer nozzle wall.

According to an aspect of the invention, an exhaust nozzle for a gas turbine engine is provided, wherein the exhaust nozzle comprises an outer nozzle wall, a flow channel which is limited radially outwards by the nozzle wall, a centerbody arranged in the flow channel, and at least two struts connecting the centerbody to the nozzle wall. A first strut is connected to the nozzle wall by a first connection, the first connection constraining movement of the strut relative to the nozzle wall in the radial direction and in the circumferential direction but allowing movement of the strut relative to the nozzle wall in the axial direction. A first actuator interacts with the first strut for displacing the first strut in the axial direction. The at least one other strut is connected to the nozzle wall by a second connection, the second connection constraining movement of the strut relative to the nozzle wall in the circumferential direction only but allowing movement of the strut relative to the nozzle wall in the radial and axial directions. At least one second actuator is provided, each second actuator interacting with one of the at least one other struts for displacing the respective strut in the axial direction.

It is further provided that the second connection is formed by a second sliding element extending radially from the radial outer end of the strut and a second receiving slot extending in the axial direction in the nozzle wall, wherein the second sliding element is at least partly arranged in the second receiving slot, the second sliding element comprises an interaction zone in which it interacts with the second actuator for axial movement of the strut, and wherein the interaction zone has a radial length such that the interaction between the second actuator and the interaction zone is maintained when the second sliding element is moved in the radial direction by radial thermal expansion of the strut and/or the centerpiece.

Aspects of the invention are thus based on the idea to allow for a sliding movement of at least one of the struts relative to the nozzle wall in the radial direction, such radial movement allowing to compensate for a different thermal expansion of the struts and centerbody compared to the thermal expansion of the nozzle wall. At the same time, there is provided for an interaction zone in which an actuator interacts with a sliding element of the radially displaceable strut, wherein the interaction zone is of sufficient radial length to ensure that when the sliding element is moved in the radial direction the interaction between the actuator and the interaction zone is maintained.

In an embodiment, the second sliding element is formed as a flat element having a surface that extends in the axial direction, wherein the interconnection zone for interacting with the second actuator is formed by a toothing in the surface of the flat second sliding element. The toothing may be formed as a toothed rack. Typically, the toothed rack comprises teeth formed substantially in the radial direction, whilst the main direction of the whole rack is axial.

The second actuator may comprise a worm screw that interacts with the toothing formed on the surface of the second sliding element. In an embodiment, the second actuator and the toothing of the second sliding element form a worm and rack drive.

In an embodiment, the interaction zone has a radial length that is at least equal to the maximum radial expansion that the struts and the centerbody experience between a cold condition and maximum temperatures reached during operation.

The second sliding element is form-fitted only in the circumferential direction to the second receiving slot. Accordingly, the second sliding element is formed and arranged such in the second receiving slot that it cannot be displaced in the circumferential directions but can be displaced in the radial and axial directions.

The second receiving slot may be formed as a slot with rectangular cross-section.

In an embodiment, the second receiving slot has a radial length that is larger than the maximum radial expansion of the struts and of the centerbody between a cold condition and temperatures reached during operation of the gas turbine engine. Thereby, radial expansion of the struts and of the centerbody can take place without thermal stresses acting between the nozzle wall and the struts.

In an embodiment, the first connection is formed by a first sliding element and a first receiving slot, wherein the first sliding element extends radially from the radial outer end of the strut. It further extends in the axial direction, thereby forming an elongated lip or rail. The first receiving slot extends in the axial direction in the nozzle wall such that the first sliding element and the first receiving slot allow to displace the strut relative to the nozzle wall in the axial direction. It is further provided that the first sliding element is form-fitted in the radial and circumferential directions to the first receiving slot. Accordingly, the first sliding element is formed and arranged such in the first receiving slot that it cannot be displaced in the radial and circumferential directions. The first actuator interacts with the first sliding element to cause axial movement of the first sliding element and respective strut.

The first sliding element and the first receiving slot may comprise, in cross section, corresponding keyhole shapes that provide for the form-fit in the radial and circumferential directions (wherein the cross-section of the keyhole shape of the sliding element is smaller than the cross-section of the keyhole shape of first receiving slot). For example, the first sliding element and the first receiving slot may both comprise a circular cross-section. In another example, the first sliding element and the first receiving slot may form a dovetail-connection.

In an embodiment, the first sliding element comprises a toothing, wherein the first actuator interacts with the toothing. For example, the toothing forms a toothed rack. The toothed rack may comprise teeth which run substantially in the circumferential direction.

The first actuator may be formed by a worm screw that interacts with the toothing of the first sliding element. In particular, the first actuator and the toothing of the first sliding element may form a worm and rack drive.

The first sliding element may comprise a radial outer section. In such case the toothing may be formed in the radial outer section of the first sliding element. For example, the radial outer section of the first sliding element is formed as a cylinder, wherein the toothing is formed in the radial outer side of the cylinder.

In an embodiment, the nozzle comprises exactly two struts, one strut being connected to the nozzle wall by the first connection and the other strut being connected to the nozzle wall by the second connection. The two struts may be arranged approximately in a plane. In such case, such plane defines a lateral direction, wherein the radial direction is identical to the lateral direction.

In case of exactly two struts, the first connection may be realized in an inboard area of the nozzle located adjacent an aircraft fuselage that carries the gas turbine engine which implements the exhaust nozzle and the second connection may be realized at an outboard area of the nozzle located remote to the aircraft fuselage.

The exhaust nozzle may be a convergent-divergent nozzle, wherein the cross-section of the nozzle first decreases in the downstream direction towards a nozzle throat area (usually referred to as A8) and subsequently increases until it reaches the nozzle exit area (usually referred to as A9). By translating the centerbody relative to the outer nozzle wall, the degree of expansion of the flow channel behind the nozzle throat area, i.e. the ratio of A9 to A8, can be adjusted.

According to an embodiment, the nozzle is configured as the nozzle of a supersonic gas turbine engine which is designed for operating conditions in the subsonic, transonic and supersonic ranges.

According to a further aspect of the invention, an exhaust nozzle for a gas turbine engine is provided which comprises: an outer nozzle wall, a flow channel which is limited radially outwards by the nozzle wall, a centerbody arranged in the flow channel, and at least two struts connecting the centerbody to the nozzle wall. It is provided that the struts are each connected to the nozzle wall by a connection that constrains movement of the strut relative to the nozzle wall in the circumferential direction but allows movement of the strut relative to the nozzle wall in the radial and axial directions. Further, actuators are provided, wherein each actuator is associated with a strut for displacing the strut in the axial direction. The connection is formed in each case by a sliding element extending radially from the radial outer end of the strut and a receiving slot extending in the axial direction in the nozzle wall, wherein the sliding element is at least partly arranged in the receiving slot, the sliding element comprises an interaction zone in which it interacts with the actuator for axial movement of the strut, and wherein the interaction zone has a radial length such that the interaction between the actuator and the interaction zone is maintained when the sliding element is moved in the radial direction by radial thermal expansion of the strut and/or the centerpiece.

This aspect of the invention is based on the idea to allow for a sliding movement of all struts relative to the nozzle wall in the radial direction, such radial movement allowing to compensate for a different thermal expansion of the struts and centerbody compared to the thermal expansion of the nozzle wall. Further, there is provided at each connection an interaction zone in which an actuator interacts with a sliding element of the radially displaceable strut, wherein the interaction zone is of sufficient radial length to ensure that when the sliding element is moved in the radial direction the interaction between the actuator and the interaction zone is maintained.

It should be noted that, when referring to a movement in the axial direction, the movement can be both in the axial direction and against the axial direction, i.e., back and forth.

It should further be noted that the present invention is described in terms of a cylindrical coordinate system having the coordinates x, r and φ. Here x indicates the axial direction, r the radial direction and φ the angle in the circumferential direction. The axial direction is defined by the machine axis/engine centerline of the gas turbine engine, with the axial direction pointing from the engine inlet to the engine outlet. The axial direction of the gas turbine engine is at least substantially identical with the axial direction of the exhaust nozzle of the gas turbine engine. Starting from the x-axis, the radial direction points radially outwards. Terms such as "in front of" and "behind" refer to the axial direction or flow direction in the engine. Terms such as "outer" or "inner" refer to the radial direction.

The invention will be explained in more detail on the basis of exemplary embodiments with reference to the accompanying drawings in which.

Figure 3:
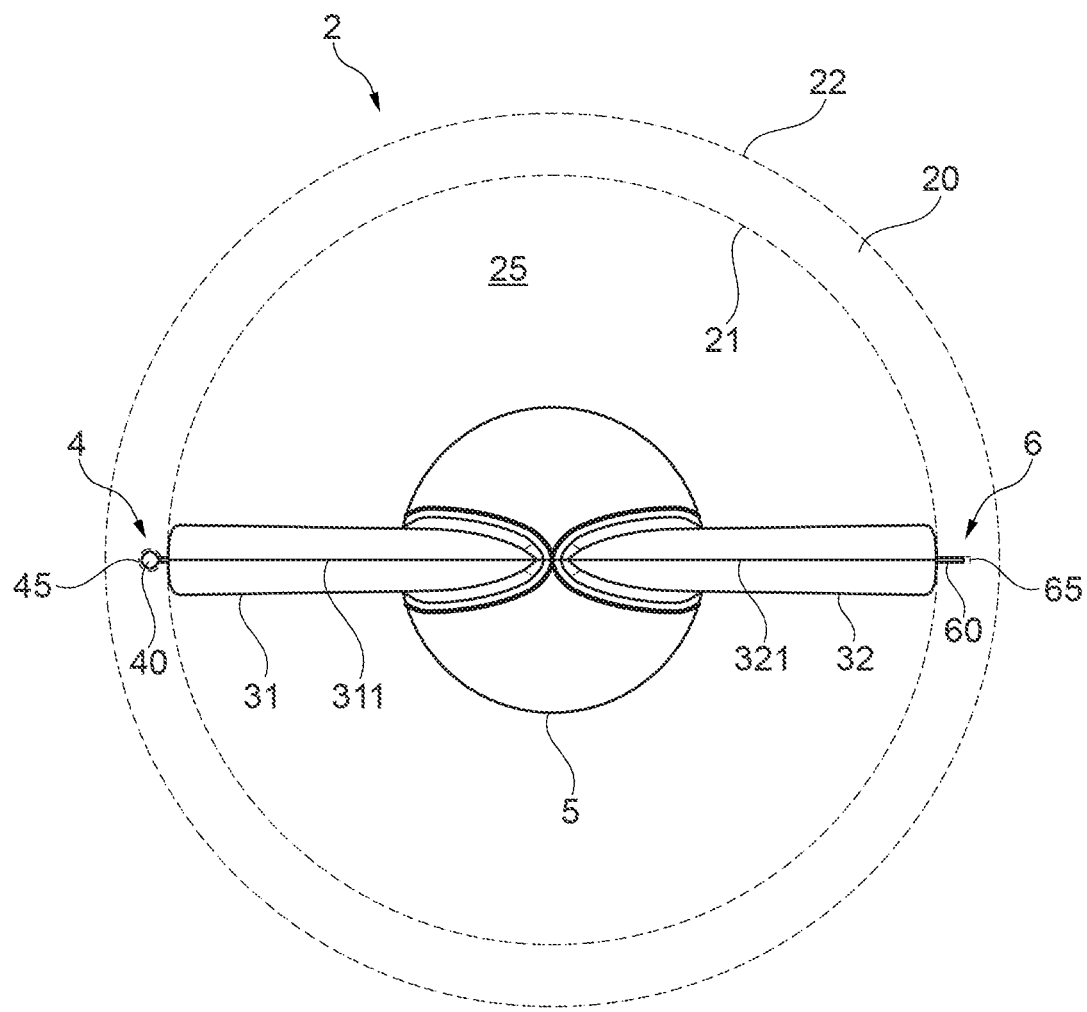
FIG. 3 is a partly sectional front view of an embodiment of an exhaust nozzle that comprises a centerbody that is connected via two struts to an outer nozzle wall, wherein different connections are implemented to connect the struts with the outer nozzle wall.
Figure 4:
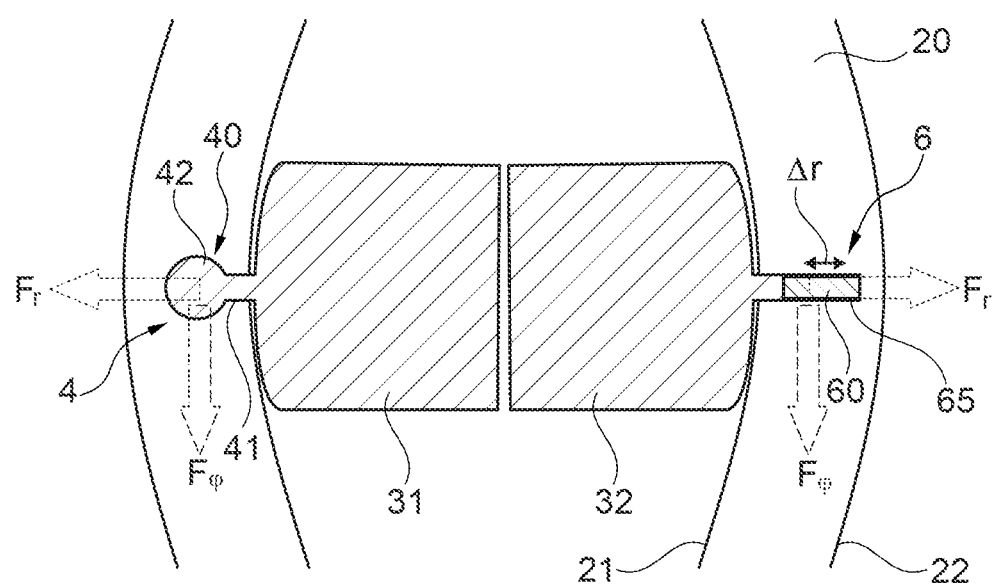
Figure 5:
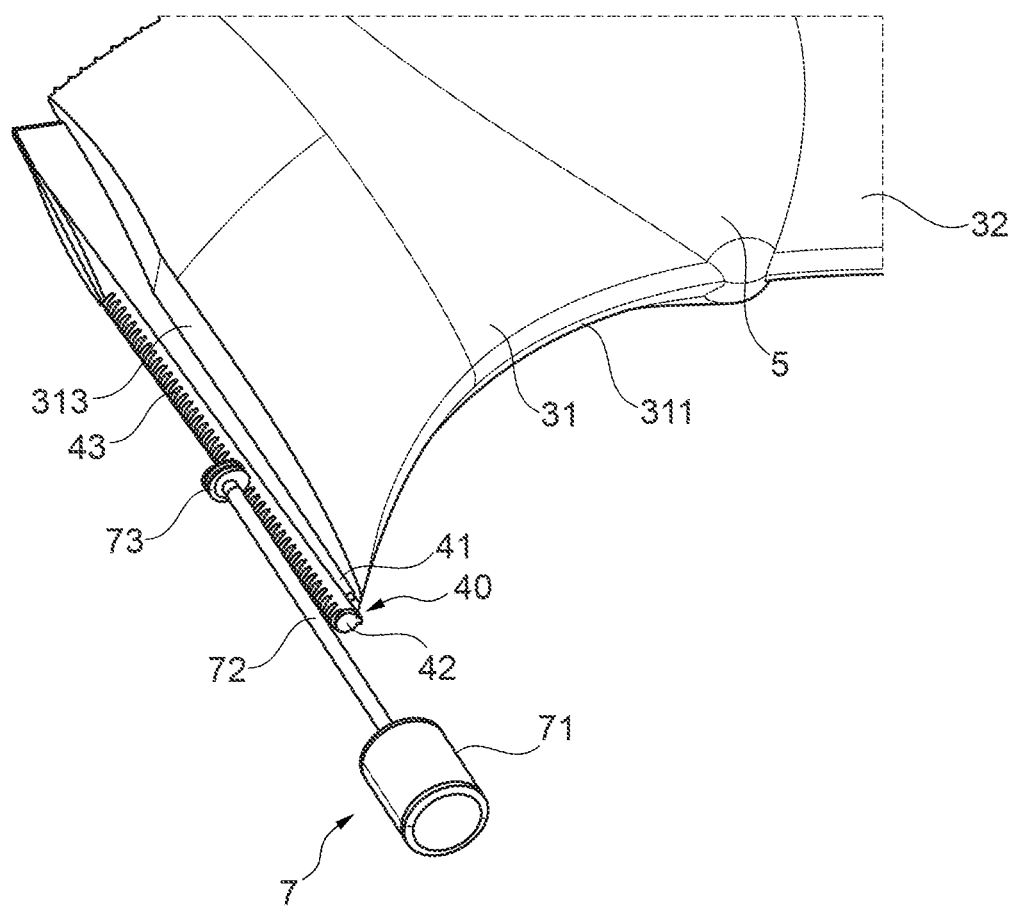
Figure 6:
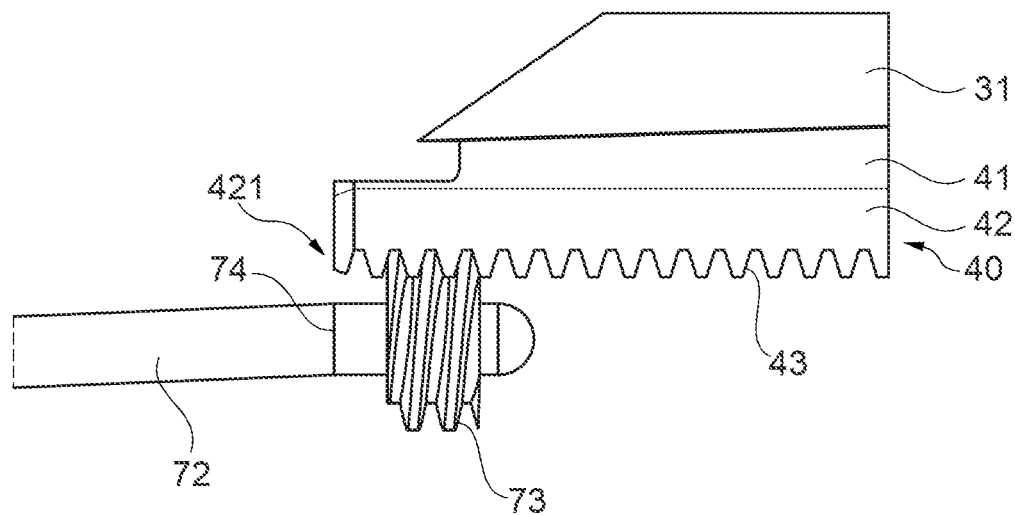
Figure 7:
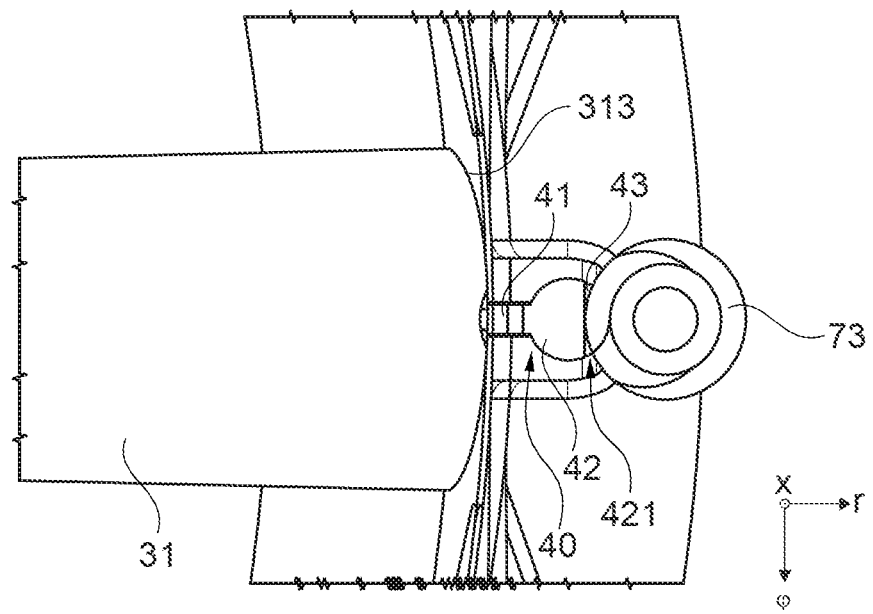
Figure 8:
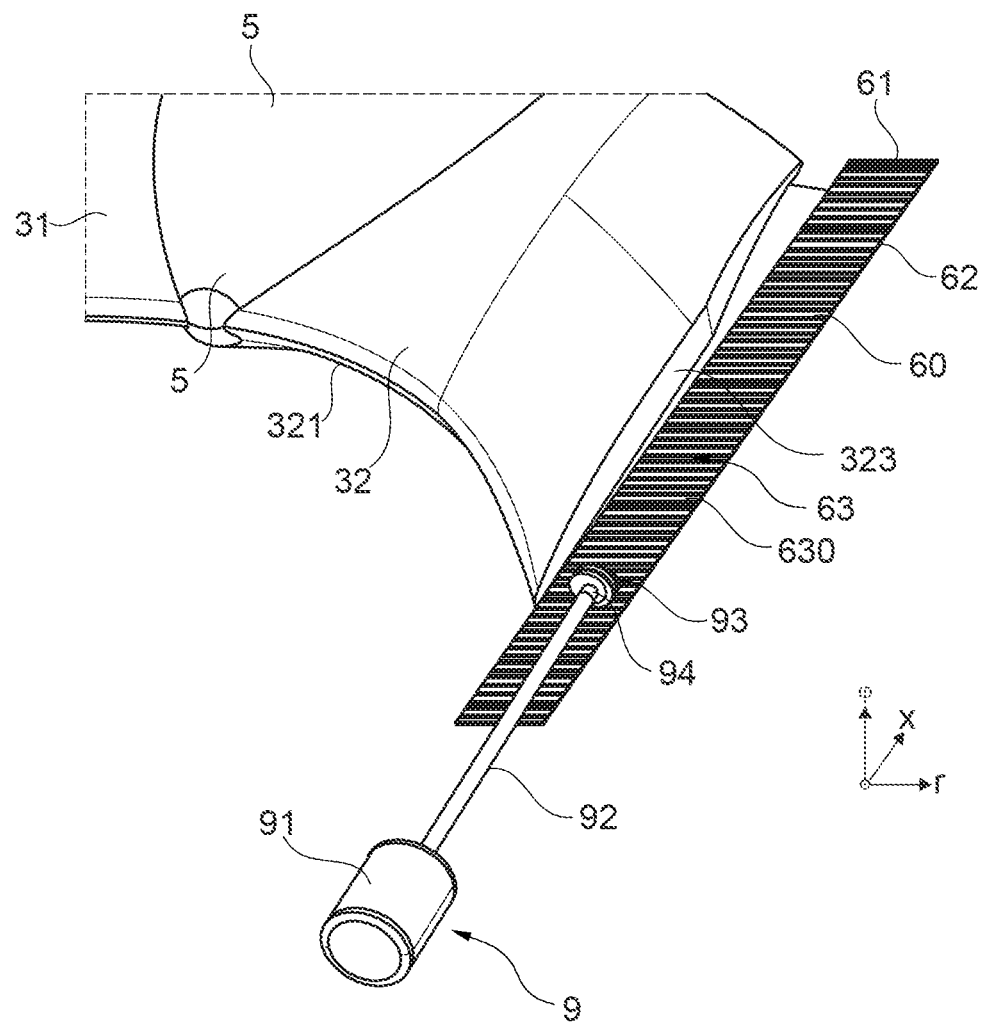
Figure 9:
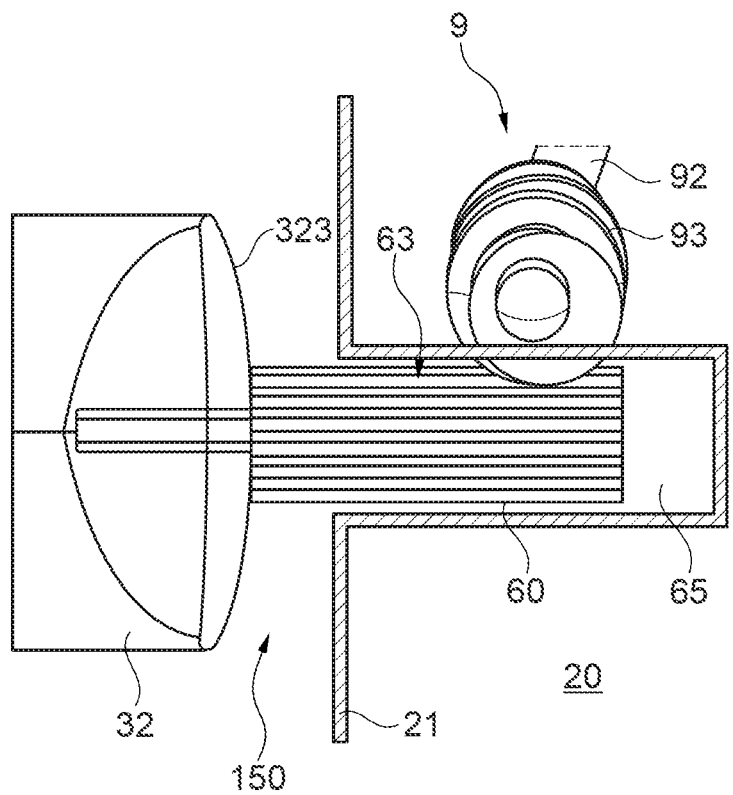
Figure 10:
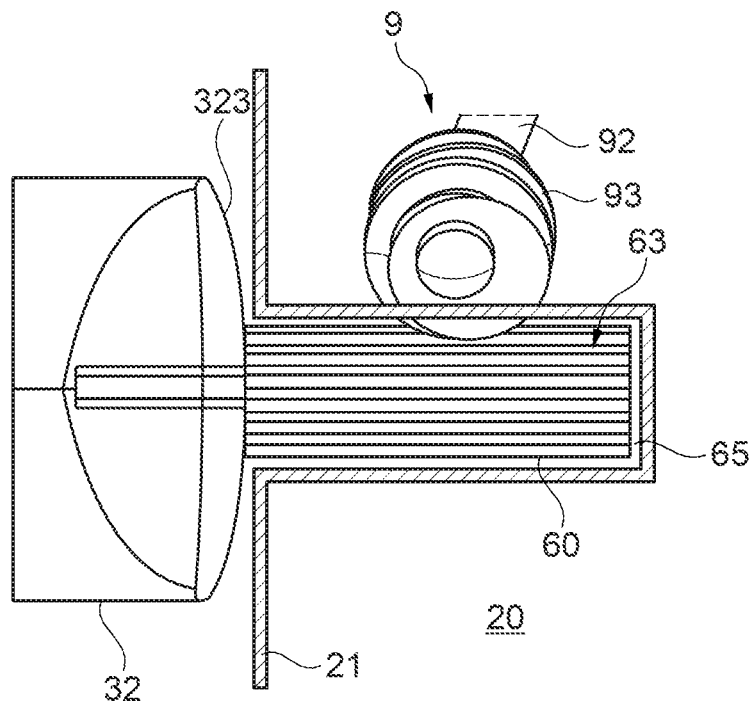

FIG. 4 a schematic front view of an exhaust nozzle in accordance with FIG. 3, wherein the acting forces are schematically indicated;

FIG. 5 shows an embodiment of a drive connection between an actuator that comprises a worm screw and a toothed rack that is formed in a sliding element of a strut, wherein the worm and rack connection is integrated into a first connection that constrains a relative movement between the strut and the outer nozzle in the radial direction;

FIG. 6 is an enlarged top view of the worm screw and the toothed rack of the embodiment of FIG. 5;

FIG. 7 is a rear view of the worm screw and the toothed rack of the embodiment of FIG. 5:

FIG. 8 shows an embodiment of a drive connection between an actuator that comprises a worm screw and a toothed rack that is formed in a flat sliding element of a strut, wherein the warm and rack connection is integrated into a second connection that enables a relative movement between the strut and the outer nozzle in the radial direction, wherein the toothed rack is formed in the surface of the flat sliding element;

FIG. 9 the arrangement of the flat sliding element of FIG. 8 in a receiving slot of the outer nozzle wall with a first radial extension of the sliding element which is present in a cold condition; and FIG. 10 the arrangement of the flat sliding element of FIG. 8 in a receiving slot of the outer nozzle wall with a second radial extension of the sliding element which is present in a hot condition.

Figure 1:
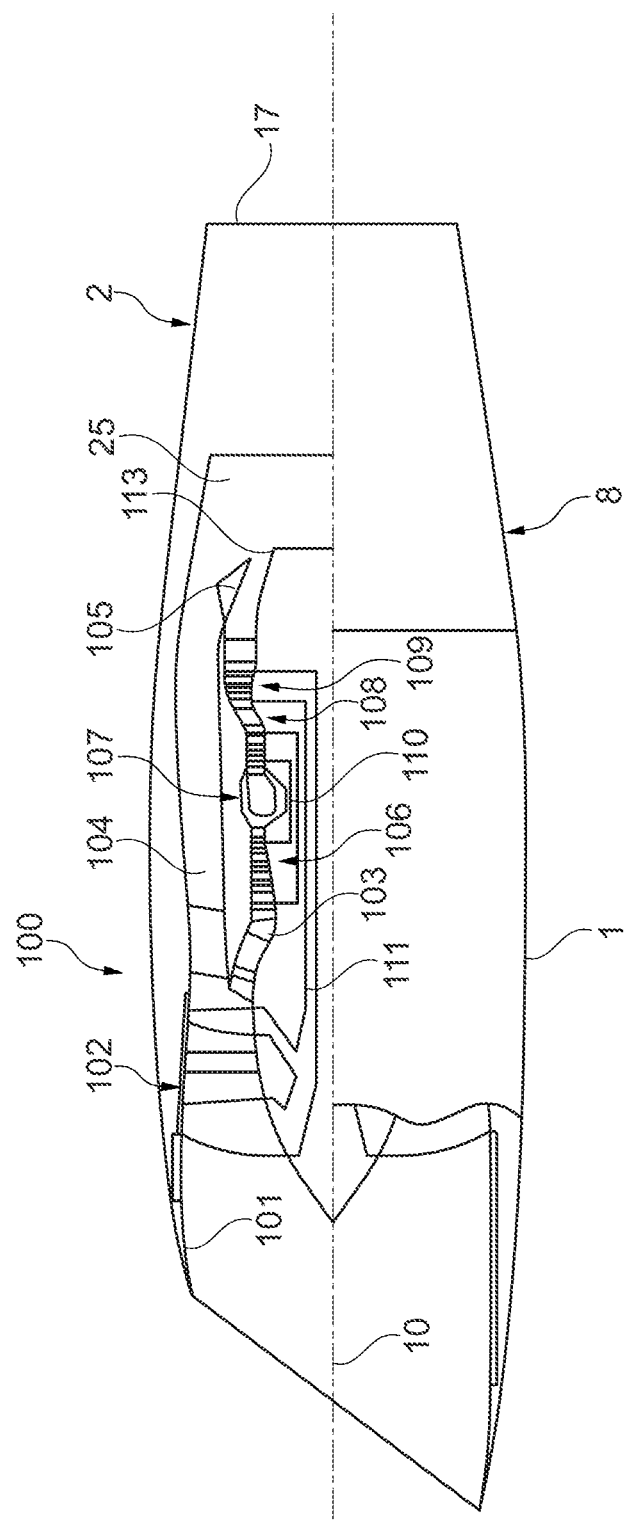
FIG. 1 is a schematic sectional side view of a supersonic gas turbine engine.

FIG. 1 shows a turbofan engine which is intended and suitable for use in a civil or military supersonic aircraft and, accordingly, is designed for operating conditions in the subsonic, transonic and supersonic ranges. However, it should be noted that the principles of this invention can also be implemented in a turbofan engine designed for subsonic operation only. The description of the invention in the context of an engine intended for a supersonic aircraft is therefore only to be understood as an example.

The turbofan engine 100 comprises an engine intake 101, a fan 102 which may be a multi-stage fan, a primary flow channel 103 which passes through a core engine, a secondary flow channel 104 which bypasses the core engine, a mixer 105 and a nozzle 2 in which a thrust reverser 8 can be integrated.

The turbofan engine 100 has a machine axis or engine centerline 10. The machine axis 10 defines an axial direction of the turbofan engine. A radial direction of the turbofan engine is perpendicular to the axial direction.

The core engine comprises a compressor 106, a combustion chamber 107 and a turbine 108, 109. In the example shown, the compressor comprises a high-pressure compressor 106. A low-pressure compressor is formed by the areas close to the hub of the fan 102. The turbine behind the combustion chamber 107 comprises a high-pressure turbine 108 and a low-pressure turbine 109. The high-pressure turbine 108 drives a high-pressure shaft 110 which connects the high-pressure turbine 108 with the high-pressure compressor 106. The low-pressure turbine 109 drives a low-pressure shaft 111 which connects the low-pressure turbine 109 with the multi-stage fan 102. According to an alternative design, the turbofan engine may also have a medium-pressure compressor, a medium-pressure turbine and a medium-pressure shaft. Furthermore, in an alternative design it can be provided that the fan 102 is coupled to the low-pressure shaft 111 via a reduction gearbox, e.g., a planetary gearbox.

The turbofan engine is arranged in an engine nacelle 1. The engine nacelle 1 may be connected to the aircraft fuselage via a pylon.

The engine intake 101 forms a supersonic air intake and is, therefore, designed and suitable for decelerating the incoming air to velocities below Ma 1.0 (Ma=Mach number). The engine inlet is beveled in FIG. 1, with the lower edge protruding from the upper edge, but other kinds of supersonic intakes may be implemented instead.

The flow channel through the fan 102 is divided behind the fan 102 into the primary flow channel 103 and the secondary flow channel 104. The secondary flow channel 104 is also referred to as the bypass channel.

Behind the core engine, the primary flow in the primary flow channel 103 and the secondary flow in the secondary flow channel 104 are mixed by the mixer 105. Furthermore, an outlet cone 113 is mounted behind the turbine in order to achieve desired cross-sections of the flow channel.

The rear area of the turbofan engine is formed by an integral nozzle 2, where the primary and secondary flows are mixed in the mixer 105 before being fed into the integral nozzle 2. The engine behind mixer 105 forms a flow channel 25, which extends through nozzle 2. Alternatively, separate nozzles can be provided for the primary flow channel 103 and the secondary flow channel 104 meaning that the flow through the secondary flow channel 104 has its own nozzle that is separate to and radially outside the core engine nozzle. One or both nozzles (whether mixed or split flow) may have a fixed or variable area.

Figure 2:
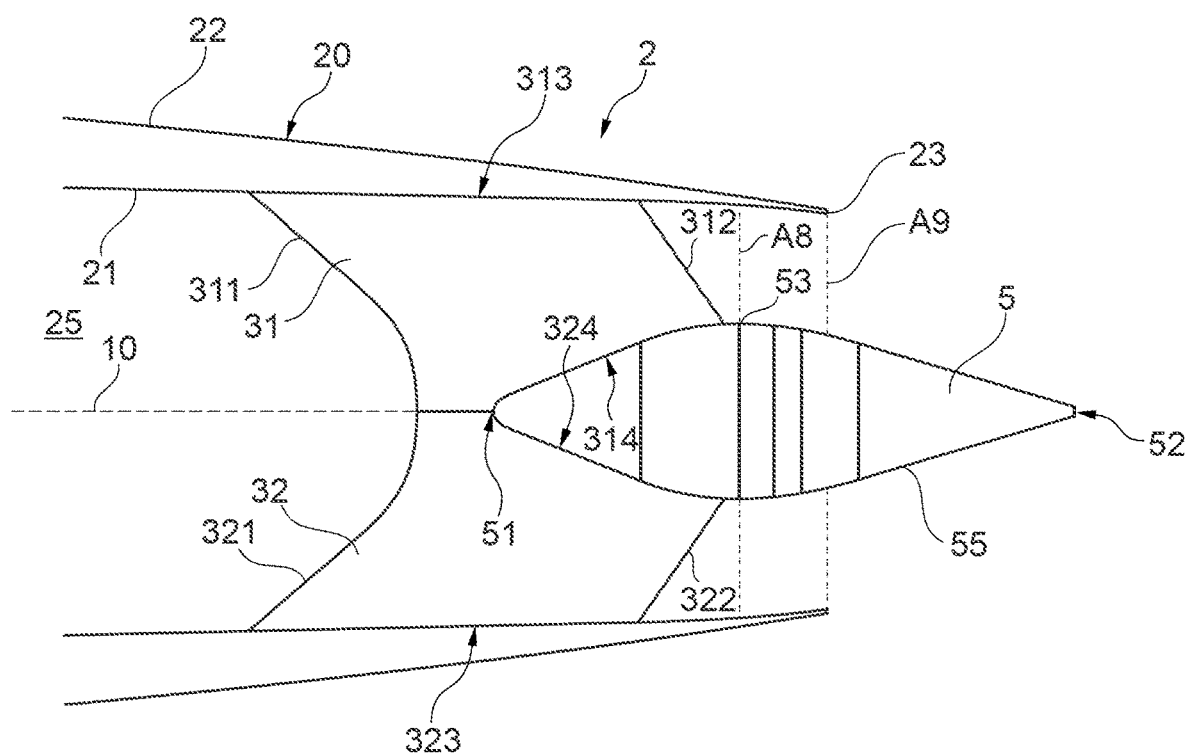
FIG. 2 is a sectional view of an example of an exhaust nozzle that comprises a centerbody that is connected via two struts to an outer nozzle wall.

In the context of this invention, the design of the nozzle 2 is of relevance. FIG. 2 shows schematically the basic design of the nozzle 2 in a sectional view that contains the engine centerline 10. Nozzle 2 comprises an outer nozzle wall 20 formed by an inner wall 21 and an outer wall 22. The inner wall 21 forms the radially outer boundary of a flow channel 25 through the nozzle 2. The outer wall 22 is formed radially outside to the inner wall 21 and adjoins the surroundings. The inner wall 21 and the outer wall 22 may converge at a point downstream to form a nozzle exit edge 23 at their downstream end.

The nozzle 2 also includes a centerbody 5, which forms a surface 55. The centerbody 5 has a longitudinal axis identical to the engine centerline 10. The centerbody 5 forms an upstream end 51, a downstream end 52 and a maximum 53 of its cross-sectional area between the upstream end 51 and the downstream end 52. In the example shown, but not necessarily, the centerbody 5 is conical adjacent to its upstream end 51 and towards its downstream end 52.

The nozzle 2 forms a nozzle throat area A8 where the cross-sectional area between centerbody 5 and inner wall 21 is minimum. Typically, the axial position of the nozzle throat area A8 is defined by the axial position of the maximum 53 of the centerbody 5. However, this is not necessarily the case. At the nozzle exit edge 23, the thrust nozzle forms a nozzle exit area A9. This area is equal to the difference between the cross-sectional area formed by the inner wall 21 at the nozzle exit edge 23 and the cross-sectional area of the centerbody 5 in the plane under consideration. The ratio A9 to A8 defines the degree of expansion of the flow channel 25 behind the nozzle throat area A8.

The nozzle 2 further comprises two struts 31, 32 connecting the centerbody 5 to the nozzle wall 20, namely, the inner wall 21. They extend from the centerbody 5 in a radial direction through the flow channel 25 to the nozzle wall 20. The struts 31, 32 each have a profile with a front edge 311, 321 and a rear edge 312, 322, as well as an upper side and a lower side. Each strut 31, 32 has a radially outer end 313, 323 at which it is connected to the inner wall 21 and a radially inner end 314, 324 at which it is connected to the centerbody 5.

The struts 31, 32, which may also be referred to as wings, are approximately arranged in a plane containing the engine centerline 10. An arrangement of the struts "approximately" in a plane exists insofar as the struts have a three-dimensional extension corresponding to the profile they form. Furthermore, in embodiments, it may be provided that the two struts 31, 32 are arranged at an angle to each other.

The centerbody 5 is fixed to the struts 31, 32. The struts 31, 32 can be displaced relative to the outer nozzle wall 20, as will be discussed with respect to FIGS. 5-10.

The centerbody 5 may be a modulated centerbody, the cross-section of which varies along the axial direction, wherein the cross-section may have one or several maxima.

With both struts 31, 32 being connected to the outer nozzle wall 20, thermal expansion of the struts 31, 32 and of the centerbody 5 leads to thermal stresses between the struts 31, 32 and the outer nozzle wall 20.

FIGS. 3-10 discuss embodiments in which the struts 31, 32 are connected to the outer nozzle wall 20 in a manner that allows to compensate for thermal expansion of the centerbody 5 and struts 31, 32. FIG. 3 shows in front view a centerbody 5, which is connected by means of two struts 31, 32 to an outer nozzle wall 20 which comprises an inner wall 21 and an outer wall 22, similar to the example discussed with respect to FIG. 2. The struts 31, 32 have respective front edges 311, 321.

The nozzle wall 20 has a circular cross-section. The centerbody 5 is located at the centerline of the nozzle 2, which is identical to the centerline of the gas turbine engine. A flow channel 25 through the nozzle is limited radially outwards by the nozzle wall 20, namely, its inner wall 21.

The struts 31, 32 are connected by means of different connections 4, 6 to the nozzle wall 20. More particularly, strut 31 is connected to nozzle wall 20 by means of a first connection 4. The first connection 4 is formed by a first sliding element 40 and a first receiving slot 45 which both extend in the axial direction, wherein the first receiving slot 45 extends axially in the nozzle wall 20. The first sliding element 40 extends radially from the radially outer end 313 of the strut 31 in the height of the front edge 311 and is located in a form-fit manner in the first receiving slot 45. Such form-fit connection constrains movement of the first sliding element 40 and thus of the strut 31 both in the radial direction and in the circumferential direction. However, a relative movement in the axial direction is enabled.

The corresponding forms of the first sliding element 40 and of the first receiving slot 45 shown in FIG. 3 are to be understand as an example only. Other corresponding forms which allow for an axial movement while hindering a radial and circumferential movement may be implemented instead. Generally, the first sliding element 40 and the first receiving slot 45 may comprise corresponding key-hole sliding profiles.

The other strut 32 is connected to nozzle wall 20 by means of a second connection 6. The second connection 6 is formed by a second sliding element 60 and a second receiving slot 65 which both extend in the axial direction, wherein the second receiving slot 60 extends axially in the nozzle wall 20. The second sliding element 60 extend radially from the radially outer end 323 of strut 32. It is formed as a blade, having a rectangular cross-section. The second receiving slot 65 is formed as a blade slot, having also a rectangular cross-section.

Depending on the temperature and thermal expansion of the struts 31, 32 and of the centerbody 5, the second sliding element 60 can move in and against the radial direction within the second receiving slot 65. Accordingly, while one strut 31 is constrained in the radial direction, the other strut 32 does not experience any radial constraint and is free to expand in the radial direction, thereby avoiding the buildup of thermal stresses between the struts 31, 32 and the nozzle wall 20.

The circumferential constraint that is present at both connections 4, 6 is almost indifferent thermal expansion.

The radial length of the receiving slot 65 is designed such that sufficient radial expansion Δr of the struts 31, 32 and of the centerbody 5 is possible. In this respect, in one embodiment the struts have been sized and designed in cold condition such that, when heated up by hot airflow during operation, the struts expand to the ideal annulus lines under steady-state temperatures. The ideal annulus line is such that the radial outer ends 313, 323 of struts 31, 32 rest adjacent the inner wall 21 of the nozzle wall 20, without exercising a stress on the nozzle wall. At the same time, the blade 60 which represents the second sliding element is moved to a maximum Δr in the radial direction into the blade slot 65. Accordingly, the design of the struts is such that a natural thermal growth in hot conditions is enabled without transmitting excessive thermally induced loads.

The length of the blade slot 65 depends on the coefficient of thermal expansion of the material used for the struts and for the centerbody. When using metal components, the radial expansion Δr from the cold state condition to a high steady-state temperatures may be in the range between 5 mm and 10 mm. Accordingly, in embodiments, the radial length of the receiving slot may be in the range between 8 and 20 mm.

As discussed, the two struts 31, 32 may be arranged approximately in a plane, such that the two connections 4, 6 are approximately located at opposite sides of the nozzle wall. If the gas turbine engine which comprises the nozzle wall is attached to the fuselage of an airplane, it may be provided that the first connection 4 is located at the inboard side and that the second connection 6 is located at the outboard side of the nozzle.

FIG. 4 shows in a schematic manner the two different connections 4, 6 of the first strut 31 and the second strut 32. The depiction is similar to that of FIG. 3, wherein the connections 4, 6 have been exaggerated, and wherein radial forces $F_r$ and circumferential forces $F_\varphi$ that may apply are shown. The first connection 4 constraints both the radial forces $F_r$ and circumferential forces $F_\varphi$. The second connection 6 restraints only the circumferential forces $F\varphi$, but allows movement of the blade 60 in the blade slot 65 in the radial direction in response to a radial force $F_r$ caused by thermal expansion, wherein a maximum radial displacement Δr can be realized within the blade slot 65, the amount of which depends on the properties of the used materials and the temperature difference.

The discussion of FIGS. 3 and 4 referred to embodiments that allow movement of at least one strut relative to the nozzle wall in the radial direction. FIGS. 5 to 10 discuss embodiments of how to displace the struts 31, 32 back and forth in the axial direction. The implementation of a driving force to displace the struts 31, 32 is carried out differently at the first connection 4 regarding strut 31 and the second connection 6 regarding strut 32.

FIGS. 5 to 7 show the provision of a driving force at the first connection 4. Generally, a driving force is applied by an actuator 7 to a toothing 43 that is integrated into the first sliding element 40 of the first connection 4. More particularly, the first sliding element 40 is an elongated element extending in the axial direction. It comprises a bridge 41 directly connected to the radially outer end 313 of strut 31 and a cylindrical element 42, the form of which corresponds to the form of the first receiving slot (not shown in FIGS. 5 to 7). The cylindrical element 42 comprises a radial outer section 421 which forms the toothing 43 which is implemented as a toothed rack. The teeth of the toothed rack run substantially in the circumferential direction in the depicted embodiment, but not necessarily.

An actuator 7 is provided which comprises a motor 71, a driving rod 72 and a worm screw 73 which meshes with the toothing 43. The worm screw 73 and the toothing 43 form a worm and rack drive. The driving rod 72 may comprise a joint 74 shown in FIG. 6 which allows to tilt the worm screw 73 with respect to the driving rod 72. The driving rod 72 may be formed by a flexible shaft alternatively. By rotating the worm screw 73, a linear movement of the sliding element 40 and, accordingly, of the strut 31 is effected, wherein the sliding element 40 is displaced in or against the axial direction depending on the direction of rotation of the worm screw 73.

It is pointed out that the provision of the toothing 43 in a cylindrical part 42 of the sliding element 40 is to be understood as exemplary only. Generally, the part of the sliding element 40 which forms the toothing 43 may have other forms.

FIGS. 8 to 10 show the provision of a driving force at the second connection 6. Generally, a driving force is applied by an actuator 9 to a toothing 63 that is integrated into the second sliding element 60 of the second connection 6. More particularly, the second sliding element 60 is formed as a flat rectangular element that that has a radial length 61 and an axial length 62. The flat sliding element 60 has an upper surface in which a toothing 63 is integrated. The toothing 63 forms a toothed rack in the second sliding element 60 having teeth 630 which run substantially in the radial direction.

An actuator 9 is provided which comprises a motor 91, a driving rod 92 and a worm screw 93 which matches with the toothing 63. The worm screw 93 and the toothing 63 form a worm and rack drive. The actuator 9 may further comprise a joint 94 shown in FIG. 8 which allows to tilt the worm screw 93 with respect to the driving rod 92. By rotating the worm screw 93, a linear movement of the second sliding element 60 and, accordingly, of the strut 32 is affected, wherein the sliding element 60 is displaced in or against the axial direction depending on the direction of rotation of the worm screw 73.

The teeth 630 of the toothing may be curved to some extent in the radial direction to have a larger contact area with the worm screw 93.

The toothing 63 formed in the second sliding element 60 extends over the complete radial length 91 of the second sliding element 60. The toothing 63 represents an interaction zone in which the actuator 9 interacts with the second sliding element 60 for axial movement of the strut 32. The radial length 61 of this interaction zone is such that the interaction between the actuator 9 and the toothing 63 is maintained when the second sliding element 60 is moved in the radial direction by radial thermal expansion of the struts 31, 32 and the centerpiece 5. This is illustrated in FIGS. 9 and 10.

FIG. 9 shows the nozzle in a cold condition in which the struts 31, 32 and the centerpiece 5 are cold. The radial extension of the second sliding element 60 in the second receiving slot 65 that is formed in the outer nozzle wall 20 is minimal. The worm screw 93 of the actuator 9 meshes with the toothing 63 formed in the upper surface of the second sliding element 60 in a radial outer section of the toothing 63. In this condition, a relatively large gap 150 is present between the radial outer end 323 of the strut and the inner wall 21 of the outer nozzle wall 20.

FIG. 10 shows the nozzle in a hot condition that is assumed during operation of the gas turbine engine which implements the nozzle. Due to thermal expansion of the struts 31, 32 and the centerpiece 5, the second sliding element 60 has moved in the radial direction within receiving slot 65. The gap 150 between the radial outer end 323 of the strut 32 and the inner wall 21 of the outer nozzle wall 20 that was present in the cold condition has disappeared or has been substantially reduced. As the interaction zone formed by the toothing 63 of the second sliding element 60 extends sufficiently in the radial direction, the worm screw 93 of the actuator 9 still meshes with the toothing 63 in the hot condition.

Accordingly, by providing for an interaction zone 63 formed in the second sliding element 60 that extends along the radial length of the second sliding element 60 an interaction between the actuator 9 and the second sliding element 60 can be maintained independent of the radial extension of the second sliding element 60.

In an alternative embodiment, both struts are connected to the nozzle wall 20 in a manner that allows movement of the struts relative to the nozzle wall 20 in the radial direction. In such case, the connection of each strut to the outer nozzle wall is similar to that shown in FIGS. 8 to 10.

In further alternative embodiments, there are provided more than two struts, such as three, four or five struts, to connect the centerbody 5 to the nozzle wall 20. In such case, it can be provided that only one of the struts is connected to the nozzle wall in a manner that constrains movement of the strut both in the radial direction and in the circumferential direction and with a driving mechanism as shown in FIGS. 5 to 7, whereas the other struts are connected to the nozzle wall in a manner that allows movement of the struts relative to the nozzle wall 20 in the radial direction and with a driving mechanism as shown in FIGS. 8 to 10.

It is pointed out that in all embodiments a thrust reverser unit can be integrated into the nozzle. In such case, the outer nozzle wall 20 is also a wall of the thrust reverser unit. In such case, the first and second receiving slots may be integrated into structural side beams of the nozzle that form part of the thrust reverser unit. Also, actuators for displacing the struts 31, 32 in the axial direction may be integrated into structural elements of the thrust reverser unit.

It should be understood that the above description is intended for illustrative purposes only and is not intended to limit the scope of the present disclosure in any way. Also, those skilled in the art will appreciate that other aspects of the disclosure can be obtained from a study of the drawings, the disclosure and the appended claims. All methods described herein can be performed in any suitable order unless otherwise indicated herein or otherwise clearly contradicted by context. Various features of the various embodiments disclosed herein can be combined in different combinations to create new embodiments within the scope of the present disclosure. In particular, the disclosure extends to and includes all combinations and sub-combinations of one or more features described herein. Any ranges given herein include any and all specific values within the range and any and all sub-ranges within the given range.

The invention claimed is:

1. An exhaust nozzle of a gas turbine engine, wherein the exhaust nozzle comprises:
   an outer nozzle wall,
   a flow channel which is limited radially outwards by the outer nozzle wall,
   a centerbody arranged in the flow channel, and
   at least two struts, including a first strut and a second strut, connecting the centerbody to the outer nozzle wall,
   a first connection connecting the first strut to the outer nozzle wall, the first connection constraining movement of the first strut relative to the outer nozzle wall in a radial direction and in a circumferential direction but allowing movement of the first strut relative to the outer nozzle wall in an axial direction,
   a first actuator interacting with the first strut for displacing the first strut in the axial direction,
   a second connection connecting the second strut to the outer nozzle wall, the second connection constraining movement of the second strut relative to the outer nozzle wall in the circumferential direction only but allowing movement of the second strut relative to the outer nozzle wall in the radial and axial directions,
   a second actuator interacting with the second strut for displacing the second strut in the axial direction,
   wherein the second connection is formed by a second sliding element extending radially from a radial outer end of the second strut and a second receiving slot extending in the axial direction in the outer nozzle wall, wherein:
      the second sliding element is at least partly arranged in the second receiving slot, the second sliding element comprises an interaction zone in which the second sliding element interacts with the second actuator for axial movement of the second strut, and the interaction zone has a radial length such that the interaction between the second actuator and the interaction zone is maintained when the second sliding element is moved in the radial direction by radial thermal expansion of the second strut and/or the centerbody.

2. The exhaust nozzle of claim 1, wherein the second sliding element is formed as a flat element having a surface that extends in the axial direction, wherein the interconnection zone for interacting with the second actuator is formed by a toothing in the surface of the second sliding flat element.

3. The exhaust nozzle of claim 2, wherein the toothing forms a toothed rack, the toothed rack comprising teeth formed substantially in the radial direction, wherein a main direction of the toothed rack is axial.

4. The exhaust nozzle of claim 2, wherein the second actuator comprises a worm screw that interacts with the toothing formed on the surface of the second sliding element.

5. The exhaust nozzle of claim 4, wherein the second actuator and the toothing of the second sliding element form a worm and rack drive.

6. The exhaust nozzle of claim 2, wherein the interaction zone radial length that is at least equal to a maximum radial expansion that the first and second struts and the centerbody experience between a cold condition and maximum temperatures reached during operation of the gas turbine engine.

7. The exhaust nozzle of claim 2, wherein the second receiving slot is formed as a slot with rectangular cross-section.

8. The exhaust nozzle of claim 2, wherein the second receiving slot has a radial length that is larger than a maximum radial expansion of the first and second struts and of the centerbody between a cold condition and temperatures reached during operation of the gas turbine engine.

9. The exhaust nozzle of claim 1, wherein the first connection is formed by a first sliding element and a first receiving slot, wherein the first sliding element extends radially from a radial outer end of the first strut, the first sliding element extends in the axial direction, the first receiving slot extends in the axial direction in the outer nozzle wall, the first sliding element is form-fitted in the radial and circumferential directions to the first receiving slot, and wherein the first actuator interacts with the first sliding element.

10. The exhaust nozzle of claim 9, wherein the first sliding element and the first receiving slot comprise, in cross section, corresponding keyhole shapes.

11. The exhaust nozzle of claim 9, wherein first sliding element comprises a toothing, wherein the first actuator interacts with the toothing.

12. The exhaust nozzle of claim 11, wherein the toothing forms a toothed rack in the first sliding element.

13. The exhaust nozzle of claim 11, wherein the first actuator is formed by a worm screw that interacts with the toothing of the first sliding element.

14. The exhaust nozzle of claim 13, wherein the first actuator and the toothing of the first sliding element form a worm and rack drive.

15. The exhaust nozzle of claim 11, wherein the first sliding element comprises a radial outer section, wherein the toothing is formed in the radial outer section of the first sliding element.

16. The exhaust nozzle of claim 15, wherein the radial outer section of the first sliding element is formed as a cylinder, wherein the toothing is formed in the radial outer side of the cylinder.

17. The exhaust nozzle of claim 1, wherein the nozzle comprises exactly two struts, the first strut being connected to the outer nozzle wall by the first connection and the second strut being connected to the outer nozzle wall by the second connection.

18. The exhaust nozzle of claim 17, wherein the first connection is realized in an inboard area of the nozzle located adjacent an aircraft fuselage and the second connection is realized at an outboard area of the nozzle located remote to the aircraft fuselage.

19. The exhaust nozzle of claim 1, wherein the nozzle is configured as the nozzle of a supersonic gas turbine engine.

20. An exhaust nozzle of a gas turbine engine, wherein the exhaust nozzle comprises:

an outer nozzle wall, a flow channel which is limited radially outwards by the outer nozzle wall, a centerbody arranged in the flow channel, and at least two struts, including a first strut and a second strut, connecting the centerbody to the outer nozzle wall, a connection connecting the first and second struts to the outer nozzle wall, the connection constraining movement of the first and second struts relative to the outer nozzle wall in a circumferential direction but allowing movement of the first and second struts relative to the outer nozzle wall in radial and axial directions, first and second actuators respectively connected to the first and second struts for displacing the first and second struts in the axial direction, wherein the connection includes a sliding element extending radially from a radial outer end of one of the first and second struts a receiving slot extending in the axial direction in the outer nozzle wall, wherein:

the sliding element is at least partly arranged in the receiving slot, the sliding element comprises an interaction zone in which the sliding element interacts with the actuator for axial movement of the one of the first and second struts, and the interaction zone has a radial length such that the interaction between the actuator and the interaction zone is maintained when the sliding element is moved in the radial direction by radial thermal expansion of the one of the first and second struts and/or the centerbody.

* * * * *